United States Patent
Yoon et al.

(10) Patent No.: US 9,520,615 B2
(45) Date of Patent: Dec. 13, 2016

(54) THIN FILM BATTERY HAVING IMPROVED BATTERY PERFORMANCE THROUGH SUBSTRATE SURFACE TREATMENT AND METHOD FOR MANUFACTURING SAME

(71) Applicant: GS ENERGY CORPORATION, Seoul (KR)

(72) Inventors: Young Jin Yoon, Seoul (KR); Jae Hwan Ko, Seoul (KR)

(73) Assignee: APPLIED MATERIALS, INC., Santa Clara, CA (US)

( * ) Notice: Subject to any disclaimer, the term of this patent is extended or adjusted under 35 U.S.C. 154(b) by 116 days.

(21) Appl. No.: 14/365,904

(22) PCT Filed: Nov. 2, 2012

(86) PCT No.: PCT/KR2012/009202
§ 371 (c)(1),
(2) Date: Jun. 16, 2014

(87) PCT Pub. No.: WO2013/089347
PCT Pub. Date: Jun. 20, 2013

(65) Prior Publication Data
US 2014/0356694 A1    Dec. 4, 2014

(30) Foreign Application Priority Data

Dec. 16, 2011    (KR) .................. 10-2011-0136049

(51) Int. Cl.
*H01M 10/0562*    (2010.01)
*H01M 10/0525*    (2010.01)
(Continued)

(52) U.S. Cl.
CPC ......... *H01M 10/0562* (2013.01); *H01M 4/134* (2013.01); *H01M 4/1395* (2013.01);
(Continued)

(58) Field of Classification Search
CPC ..................... H01M 10/0562; H01M 10/0525; H01M 2300/0071
See application file for complete search history.

(56) References Cited

U.S. PATENT DOCUMENTS 7,348,102 B2    3/2008    Li et al.
2002/0187398 A1*    12/2002    Mikhaylik .......... H01M 2/1673
429/234

(Continued)

FOREIGN PATENT DOCUMENTS

CN    1489795 A    4/2004
JP    2002198037 A    7/2002
(Continued)

OTHER PUBLICATIONS

International Search Report for PCT/KR2012/009202, mailed on Mar. 8, 2013, citing the above reference(s).
(Continued)

*Primary Examiner* — Stewart Fraser
(74) *Attorney, Agent, or Firm* — Pillsbury Winthrop Shaw Pittman LLP

(57) ABSTRACT

Disclosed are a thin film battery in which a negative electrode active material and a substrate side react with each other to prevent battery performance from deteriorating, and to a method for manufacturing same. The thin film battery according to the present invention has a structure in which a negative electrode active material contacts a substrate. Here, a first surface treatment layer containing the negative electrode active material and a non-reactive material are disposed on at least the portion where the negative electrode active material contacts the surface of the substrate.

20 Claims, 4 Drawing Sheets

(51) Int. Cl.
H01M 4/134 (2010.01)
H01M 4/1395 (2010.01)
H01M 4/36 (2006.01)
H01M 10/052 (2010.01)
H01M 6/40 (2006.01)

(52) U.S. Cl.
CPC ............ H01M 4/366 (2013.01); H01M 6/40 (2013.01); H01M 10/052 (2013.01); H01M 10/0525 (2013.01); H01M 2300/0071 (2013.01); Y02E 60/122 (2013.01); Y02P 70/54 (2015.11)

(56) References Cited

U.S. PATENT DOCUMENTS

| 2008/0213664 | A1 | 9/2008 | Krasnov et al. | |
|---|---|---|---|---|
| 2008/0263855 | A1 | 10/2008 | Li et al. | |
| 2011/0076550 | A1* | 3/2011 | Liang ................ | H01M 2/0202 429/175 |
| 2011/0274974 | A1* | 11/2011 | Sabi ................ | H01M 2/0212 429/220 |

FOREIGN PATENT DOCUMENTS

| JP | 2004022250 A | 1/2004 |
|---|---|---|
| JP | 2006179241 A | 7/2006 |
| JP | 2008159399 A | 7/2008 |
| JP | 2009509289 A | 3/2009 |
| JP | 2009543295 A | 12/2009 |
| JP | 2010205718 A | 9/2010 |
| JP | 2011108603 A | 6/2011 |
| KR | 100753824 B1 | 8/2007 |
| KR | 1020080080900 A | 9/2008 |
| KR | 20100130450 A | 12/2010 |
| KR | 1020110056937 A | 5/2011 |
| KR | 1020110112067 A | 10/2011 |

OTHER PUBLICATIONS

Japanese Office Action dated May 26, 2015 in connection with the counterpart Japanese Patent Application No. 2014-547084, citing the above references.

European Search Report dated Jul. 17, 2015 in connection with the counterpart European Patent Application No. 12856644.5, citing the above references.

Japanese Office Action dated Apr. 12, 2016 in connection with the counterpart Japanese Patent Application No. 2014-547084, citing the above reference(s).

Chinese Office Action dated Oct. 8, 2015 in connection with the counterpart Chinese Patent Application No. 201280062301.6, citing the above reference(s).

* cited by examiner

--Related Art--

Contents continue on next page.

THIN FILM BATTERY HAVING IMPROVED BATTERY PERFORMANCE THROUGH SUBSTRATE SURFACE TREATMENT AND METHOD FOR MANUFACTURING SAME

CROSS REFERENCE TO RELATED APPLICATION

This application claims the priority of KR Patent Application No. 10-2011-0136049 filed on Dec. 16, 2011 in the Korean Patent and Trademark Office. Further, this application is the National Phase application of International Application No. PCT/KR2012/009202 filed on Nov. 2, 2012, which is incorporated herein by reference in its entirety.

TECHNICAL FIELD

The present invention relates to a technique of manufacturing a thin film battery. More particularly, the present invention relates to a thin film battery which prevents side reaction from occurring between an anode active material and a substrate, which are brought into contact with each other in the thin film battery, thereby improving battery performance, and a method for manufacturing the same.

BACKGROUND ART

A thin film battery is a battery that is manufactured to a thin thickness by making basic components of the battery into thin films.

The thin film battery is a solid-state battery in which all of a cathode, an electrolyte and an anode are in a solid state and are formed to a thickness of several micrometers (μm) on a thin substrate by a deposition process, such as CVD, PVD, or the like.

With the use of a solid electrolyte, the thin film battery has various advantages, such as low risk of explosion, excellent thermal stability, low discharge rate, and the like.

FIG. 1 schematically shows a typical thin film battery.

Referring to FIG. 1, the typical thin film battery includes a cathode current collector 110, a cathode active material 120, an anode current collector 130, an electrolyte 140, and an anode active material 150.

In addition, the thin film battery is generally provided with an encapsulation member which encapsulates the remaining components except terminals of the cathode and anode current collectors 110, 130 in order to prevent moisture-penetration into the battery.

Here, in the case of a typical thin film battery, the anode current collector 130 and the electrolyte 140 overlap each other, and the anode active material 150 is not brought into direct contact with a substrate 100.

However, when the anode current collector 130 and the electrolyte 140 overlap each other, the thin film battery suffers from a phenomenon of lithium collection in a region where the two components overlap each other.

Such lithium-collection can cause cracking of an encapsulation film, so that moisture can penetrate into the battery through cracks. This results in oxidation of lithium on the side of the terminal of the anode current collector 130, thereby causing reduction in lifespan of the battery.

DISCLOSURE

Technical Problem

It is an aspect of the present inventors to provide a thin film battery having a structure in which an anode active material and a substrate directly adjoin each other, and capable of preventing side reaction between the anode active material and the substrate, and a manufacturing method thereof.

It is another aspect of the present invention to provide a thin film battery capable of preventing moisture-penetration through a rear side of a substrate, and a manufacturing method thereof.

Technical Solution

In accordance with one aspect of the present invention, a thin film battery has a structure in which an anode active material and a substrate adjoin each other, wherein the substrate include a first surface treatment layer containing a material non-reactive to the anode active material and formed at least on a partial region of a surface of the substrate adjoining the anode active material.

Here, the anode active material may include lithium (Li), the first surface treatment layer may include an inorganic material such as aluminum oxide, and an organic material such as an acrylic resin.

The substrate may further a second surface treatment layer formed on a rear side thereof to prevent moisture-penetration through the rear side.

In addition, the thin film battery may include a cathode current collector formed on one side of the substrate on which the first surface treatment layer is formed; a cathode active material formed on the cathode current collector; an anode current collector formed on the other side of the substrate and separated from the cathode current collector; an electrolyte covering the cathode active material so as not to overlap with the anode current collector to allow the first surface treatment layer to be exposed outside; and an anode active material formed on the anode current collector, the electrolyte, and the first surface treatment layer.

In accordance with another aspect of the present invention, a method of manufacturing a thin film battery includes: forming a first surface treatment layer at least on a partial region of a surface of a substrate adjoining an anode active material, using a material non-reactive to the anode active material; forming a cathode current collector on one side of the substrate on which the first surface treatment layer is formed; forming a cathode active material on the cathode current collector; forming an anode current collector on the other side of the substrate to be separated from the cathode current collector; forming an electrolyte to cover the cathode active material without overlapping with the anode current collector to allow the first surface treatment layer to be exposed outside; and forming an anode active material on the anode current collector, the first surface treatment layer, and the electrolyte.

In accordance with a further aspect of the present invention, a method of manufacturing a thin film battery includes: forming a cathode current collector on one side of a substrate; forming a cathode active material on the cathode current collector; forming an anode current collector on the other side of the substrate to be separated from the cathode current collector; forming an electrolyte to cover the cathode active material without overlapping with the anode current collector; forming a first surface treatment layer on a portion of the substrate exposed by non-overlap between the electrolyte and the anode current collector, using a material non-reactive to lithium; and forming an anode active material on the anode current collector, the first surface treatment layer, and the electrolyte.

Advantageous Effects

The thin film battery according to the present invention has an effect of preventing side reaction between an anode active material and a substrate through surface treatment of the substrate. Therefore, the present invention can prevent a reduction in battery performance which can occur due to side reaction between the anode active material and the substrate.

Further, the thin film battery according to the present invention has a rear side of the substrate also subjected to surface treatment, thereby providing an effect of preventing moisture-penetration through the rear side of the substrate, thereby preventing reduction in performance and lifespan of the battery.

On the other hand, reduction in performance and lifespan of the battery can be checked by discoloration of the anode active material, battery capacity, voltage drop or the like after a predetermined period of time. With this regard, since the anode active material is not discolored even after storage for 30 days at 90° C. after manufacture thereof, the thin film battery according to the present invention exhibits excellent thermal operation stability and aging characteristics.

BEST MODE

Hereinafter, a thin film battery having improved battery performance with surface treatment according to the present invention and a manufacturing method thereof will be described with reference to the accompanying drawings.

Figure 2:
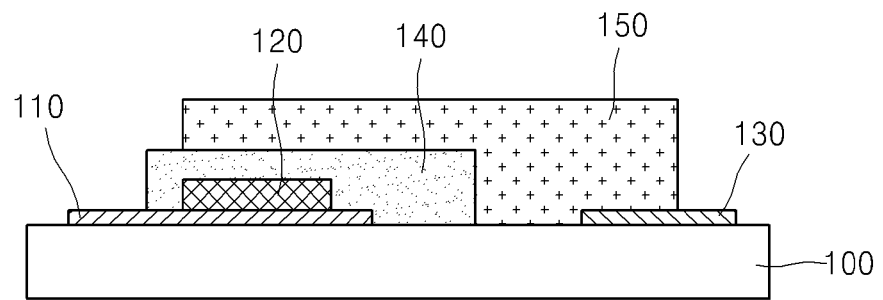
FIG. 2 is a cross-sectional view of a thin film battery having a structure in which an anode active material and a substrate adjoin each other.

FIG. 2 is a cross-sectional view of a thin film battery having a structure in which an anode active material and a substrate adjoin each other.

Referring to FIG. 2, the thin film battery includes a cathode current collector 110, a cathode active material 120, an anode current collector 130, an electrolyte 140, and an anode active material 150. Although the thin film battery of FIG. 2 also includes components as shown in FIG. 1, the thin film battery of FIG. 2 is different from that of FIG. 1 in that the electrolyte 140 is provided so as not to overlap with the anode current collector 130.

Figure 1:
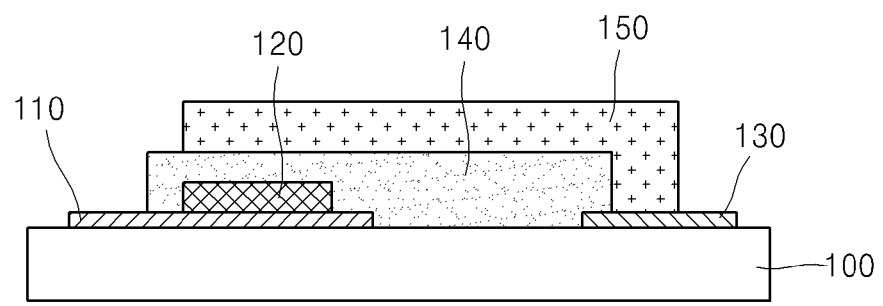
FIG. 1 is a cross-sectional view of a typical thin film battery.

Due to such a difference, in the thin film battery of FIG. 1, the anode active material 150 and the substrate 100 are not brought into direct contact with each other. However, in the thin film battery of FIG. 2, a portion of the anode active material 150 is brought into contact with the substrate 100.

When the electrolyte 140 and the anode current collector 130 overlap, a problem of lithium-collection occurs in a region where the two components overlap. However, if the electrolyte 140 and the anode current collector 130 are provided in a non-overlap state, lithium can move between the electrolyte 140 and the anode current collector 130, thereby preventing the problem of lithium-collection at an overlap portion between the electrolyte 140 and the anode current collector 130.

Consequently, cracking does not occur on an encapsulation film designed to prevent moisture-penetration, thereby preventing an exposed terminal of the node current collector 130 from suffering oxidation of lithium.

The anode active material 150 is mainly composed of metallic lithium, which is highly reactive. Thus, when the anode active material 150 and the substrate 100 adjoin each other as shown in FIG. 2, physical properties of lithium change due to side reaction between the anode active material and the substrate, thereby causing oxidation of lithium, short circuit of the anode active material, and the like.

Figure 7:
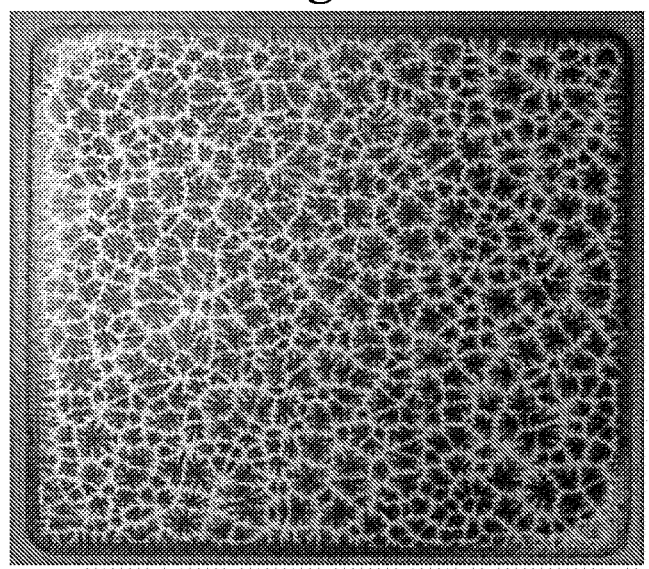
FIG. 7 shows an image of a front surface of a thin film battery after storage for 7 days at 90° C. after manufacture thereof, in which a Li anode and an $Al_2O_3$ multi-layer encapsulation film are formed on a mica substrate without a surface treatment layer.

To carry out a test, multi-layer encapsulation films including $Al_2O_3$ were formed on a glass substrate and a mica substrate, respectively, which have been deposited with Li electrodes. The multi-layer encapsulation film has very high moisture-blocking characteristics to prevent moisture from penetrating through the surface of the encapsulation film. After storage for 7 days at 90° C. in an oven, the test specimens were observed on regions in which lithium and the respective substrates adjoin each other. As a result, as shown in a frontal image of FIG. 7, the contact regions between lithium and the respective substrates were discolored black.

Particularly, in the glass substrate, the region where lithium and the substrate adjoin each other was discolored black. As such, it is considered that black discoloration is due to oxidation or alloying of lithium.

Thus, it is necessary to chemically isolate the substrate 100 from the anode active material 150 in order to prevent side reaction between the anode active material 150 and the substrate 100.

According to the present invention, the substrate 100 is subjected to surface treatment to prevent the anode active material 150 and the substrate 100 from coming into direct contact with each other.

Figure 3:
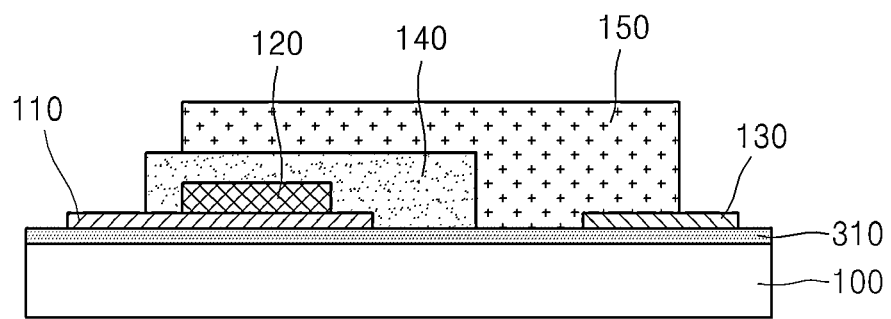
FIG. 3 is a cross-sectional view of a thin film battery having a substrate subjected to surface treatment according to one embodiment of the present invention.

FIG. 3 is a cross-sectional view of a thin film battery having a substrate subjected to surface treatment according to one embodiment of the present invention.

Referring to FIG. 3, the substrate 100 is formed with a first surface treatment layer 310, which includes a material non-reactive to the anode active material 150, on a partial region of the surface thereof adjoining the anode active material 150.

Here, when the anode active material 150 is formed of lithium, the first surface treatment layer 310 is formed in a single or multiple layers using a material non-reactive to lithium. The material non-reactive to lithium may be an inorganic or organic material.

The inorganic material may include at least one selected from among silicon nitride, aluminum nitride, zirconium nitride, titanium nitride, hafnium nitride, tantalum nitride, silicon oxide, aluminum oxide, zirconium oxide, magnesium oxide, titanium oxide, cerium oxide, indium oxide, tin oxide, SiON, TiAlO, and the like.

The organic material may include at least one selected from among diazo, azide, acrylic, polyamide, polyester, epoxy, polyether, urethane, polystyrene, acrylic, urea, isocyanate, xylene resins, and the like.

When the organic material is used for the anode active material, a lower layer containing the organic material may be first formed and an upper layer containing the inorganic material may be formed thereon to improve adhesion.

Further, the manufacturing process of the thin film battery includes heat treatment at 500° C. or more in order to crystallize the cathode active material 120. Thus, the organic material is preferably applied to a partial region of the substrate adjoining the anode active material after heat-treatment. On the other hand, the inorganic material may be deposited not only on the partial region of the substrate adjoining the anode active material, but also on the overall surface of the substrate, irrespective of heat-treatment.

With the configuration in which the first surface treatment layer 310 is formed on the region of the substrate adjoining the anode active material 150, the substrate 100 and the anode active material 150 can be chemically isolated from each other. Thus, this configuration can prevent reduction in battery performance due to side reaction between the substrate 100 and the anode active material 150.

Figure 8:
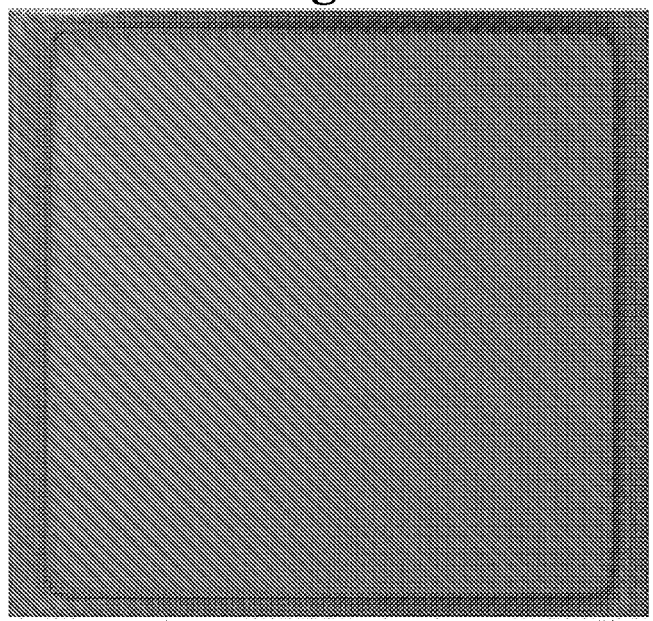
FIG. 8 shows an image of a front surface of a thin film battery after storage for 30 days at 90° C. after manufacture thereof, in which a Li anode and an $Al_2O_3$ multi-layer encapsulation film are formed on a mica substrate after forming a first surface treatment layer.

To carry out a test, multi-layer encapsulation films including $Al_2O_3$ were formed on a glass substrate and a mica substrate, respectively, which have been deposited with Li electrodes. After storage for 30 days at 90° C. in an oven, the test specimens were observed on regions in which lithium and the respective substrates adjoin each other. As a result, as shown in a frontal image of FIG. 8, there was no discoloration on the contact regions.

As shown in FIG. 3, the first surface treatment layer 310 may be formed on the overall surface of the substrate 100. In this case, the first surface treatment layer 310 formed on the overall surface of the substrate 100 can prevent moisture from penetrating through the rear side of the substrate 100. However, it is not necessary to form the first surface treatment layer 310 on the overall surface of the substrate 100.

Figure 4:
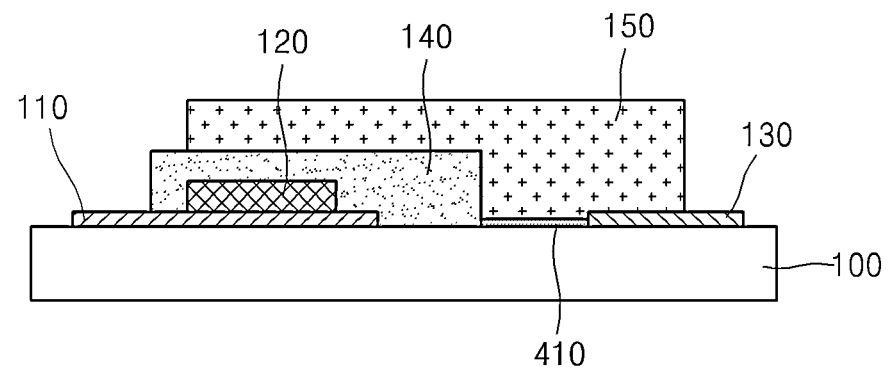
FIG. 4 is a cross-sectional view of a thin film battery having a substrate subjected to surface treatment according to another embodiment of the present invention.

FIG. 4 is a cross-sectional view of a thin film battery having a substrate subjected to surface treatment according to another embodiment of the present invention.

Referring to FIG. 4, a first surface treatment layer 410 may be partially formed on the surface of the substrate 100, and a region of the surface for the first surface treatment layer 410 to be formed includes a region of the substrate 100 adjoining the anode active material 150.

That is, the first surface treatment layer 410 may be partially formed on the surface of the substrate 100 so long as the region of the surface for the first surface treatment layer to be formed includes the region of the substrate 100 adjoining the anode active material 150.

Next, components of the thin film battery according to the present invention will be described.

The substrate 100 of the thin film battery may be formed of a variety of materials, such as metal, ceramic, polymer, and the like.

When the substrate is a metal substrate, the substrate may be formed of Ni, Ti, Cr, W, Mo, stainless steel, and the like.

When the substrate is a ceramic substrate, the substrate may be formed of quartz, glass, mica, and the like.

When the substrate is a polymer substrate, the substrate may be formed of a polyimide having excellent thermal resistance, or other polymeric materials, such as polytetrafluoroethylene, polyamide imide, polysulfone, polyphenylene sulfide, polyetherether ketone, and the like.

Next, the cathode current collector 110 is formed on one side of the substrate 100. The cathode current collector 110 may be formed of a highly electrically conductive material. The highly electrically conductive material includes indium tin oxide (ITO), Ag, Au, Pt, Pd, Al, Ni, Cu, Ti, V, Cr, Fe, Co, Mn, stainless steel, Hastelloy, Inconel, and the like. Such a cathode current collector 110 may be formed in a single layer, or, if needed, in multiple layers, such as Ti/Inconel/Pt, in order to improve mechanical properties including adhesion.

Then, the cathode active material 120 is formed on the cathode current collector 110. The cathode active material 120 may be formed of a variety of lithium metal oxides to a thickness ranging from hundreds of nanometers to several micrometers. The cathode active material 120 may be formed of $LiCoO_2$ having excellent electrochemical characteristics.

The cathode active material 120 is generally formed by sputtering and has a crystallized structure, which is generally obtained by heat treatment.

Subsequently, the anode current collector 130 is formed on the other side of the substrate 100 to be separated from the cathode current collector 110.

Like the cathode current collector 110, the anode current collector 130 may also be formed of a highly electrically conductive material including ITO, Ag, Au, Pt, Pd, Al, Ni, Cu, and the like, in a single or multiple layers.

Next, the electrolyte 140 serves to carry lithium ions between the cathode active material 120 and the anode active material 150 while preventing short circuit between the cathode active material 120 and the anode active material 150. To this end, the electrolyte 140 is formed of a solid electrolytic material having high ionic conductivity and specific resistance. Such an electrolytic material may include at least one selected from the group consisting of lithium phosphorous oxynitride (LiPON), lithium boron oxynitride (LiBON), lithium phosphate ($Li_3PO_4$), $Li_2O$—$B_2O_3$, $Li_2OV_2O_5$—$SiO_2$, $Li_2SO_4$—$Li_2O$—$B_2O_3$, lithium silicon phosphorous oxynitride (LiSiPON), lithium silicon oxynitride (LiSiON), lithium boron phosphorous oxynitride (LiBPON), and a combination thereof.

The electrolyte 140 is formed on an exposed portion of the cathode active material 120. Further, the electrolyte is formed to cover an exposed portion of the substrate 100 between the cathode current collector 110 and the anode current collector 130 without overlapping with the anode current collector 130, as described above. Thus, the exposed portion of the substrate 100 is formed between the electrolyte 140 and the anode current collector 130. According to the present invention, the first surface treatment layer (310 in FIG. 3 or 410 in FIG. 4) is formed at least on the exposed portion of the substrate.

Then, the anode active material 150 is formed on the anode current collector 130, the electrolyte 140, and the first surface treatment layer 310 or 410.

The anode active material 150 may be formed of metallic lithium (Li) or the like.

The thin film battery of FIG. 3 may be manufactured by sequentially depositing the first surface treatment layer 310, the cathode current collector 110, the cathode active material 120, the anode current collector 130, the electrolyte 140, and the anode active material 150 on the substrate 100.

Constitutional components of the thin film battery may be representatively formed by sputtering, but may be formed by other methods.

Here, as described above, the anode active material 150 may be formed of lithium. In this case, the first surface treatment layer 310 may be formed of a material non-reactive to lithium, such as aluminum oxide.

Further, the first surface treatment layer may be formed on the overall surface of the substrate, as shown in FIG. 3, or otherwise, may be partially formed on the surface of the substrate adjoining the anode active material.

When the first surface treatment layer is partially formed on the surface region of the substrate adjoining the anode active material as shown in FIG. 4, the first surface treatment layer may be previously formed at a predetermined position of the surface of the substrate.

Further, when the first surface treatment layer is partially formed on the surface region of the substrate adjoining the anode active material as shown in FIG. 4, the first surface treatment layer may be formed on an exposed portion of the substrate after the anode current collector and the electrolyte are formed. In this case, the thin film battery of FIG. 4 may be manufactured by sequentially forming the cathode current collector 110, the cathode active material 120, the anode current collector 130, the electrolyte 140, the first surface treatment layer 410, and the anode active material 150 on the substrate 100.

The thin film battery is generally vulnerable to moisture. To prevent moisture penetration into the constitutional elements 110 to 150 of the thin film battery, an encapsulation film (not shown) may be further formed after the constitutional components are formed.

More specifically, the encapsulation film may be formed so as to encapsulate the remaining portion other than portions of the cathode current collector 110 and the anode current collector 130 which serve as terminals.

Figure 5:
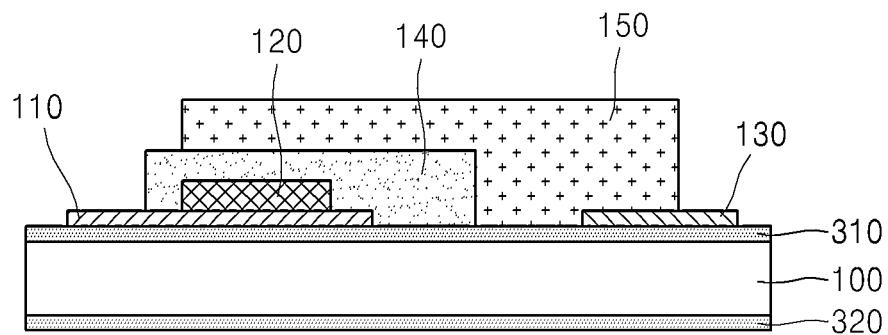
FIG. 5 is a cross-sectional view of the thin film battery of FIG. 3, in which a rear side of the substrate is also subjected to surface treatment.
Figure 6:
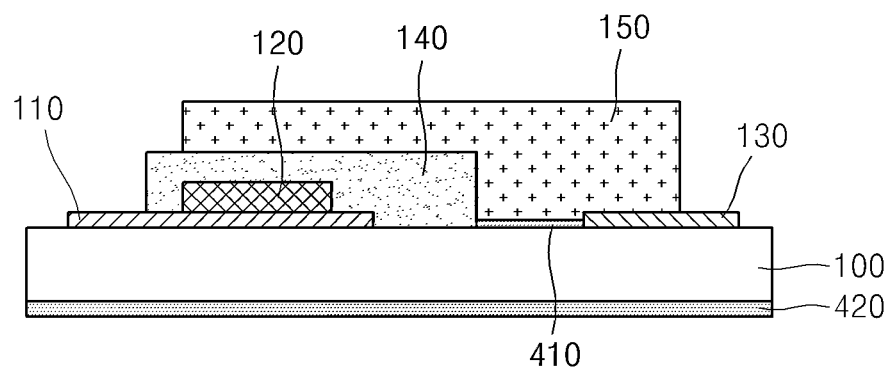
FIG. 6 is a cross-sectional view of the thin film battery of FIG. 4, in which a rear side of the substrate is also subjected to surface treatment.

FIGS. 5 and 6 show the thin-film batteries according to different embodiments of the present invention. FIG. 5 shows the thin film battery of FIG. 3 in which the rear side of the substrate is also subjected to surface treatment, and FIG. 6 shows the thin film battery of FIG. 4 in which the rear side of the substrate is also subjected to surface treatment.

Referring to FIGS. 5 and 6, a first surface treatment layer (320 in FIG. 5 or 420 in FIG. 6) may be further formed on the rear side of the substrate 100 in order to prevent moisture penetration through the rear side of the substrate.

Like the first surface treatment layer (310 in FIG. 5, or 410 in FIG. 6), the second surface treatment layer 320 or 420 may be formed of an inorganic material, such as aluminum oxide and the like, an organic material such as an acrylic resin and the like, or other material such as ceramic, metal and the like.

Further, the second surface treatment layer 320 or 420 may be formed with a getter layer in a powder type, a bulk type, or a film type, which contains at least one moisture absorbent, such as CaO, MgO, $CaCl_2$, and the like. This can improve suppression of moisture-penetration through the surface of the substrate.

Before formation of the cathode current collector, the second surface treatment layer may be formed together with the first surface treatment layer, or after the first surface treatment layer is formed. Further, the second surface treatment layer may also be formed in any step of a process of manufacturing a thin film battery.

As set forth above, in the thin film battery according to the present invention, the substrate is subjected to surface treatment using a material non-reactive to the anode active material, thereby preventing side reaction from occurring in a contact region between the anode active material and the substrate. Thus, this structure of the thin film battery can prevent reduction in performance due to side reaction between the anode active material and the substrate.

Although some embodiments have been provided to illustrate the present invention, it will be apparent to those skilled in the art that these embodiments are given by way of illustration, and that various modifications and equivalent embodiments can be made without departing from the spirit and scope of the present invention. Accordingly, the scope of the present invention should be limited only by the accompanying claims and equivalents thereof.

The invention claimed is:

1. A thin film battery comprising:
a substrate;
a first surface treatment layer over the substrate;
an electrolyte over the substrate;
an anode current collector over the substrate; and
an anode active material over the first surface treatment layer, the electrolyte, and the anode current collector, wherein
the anode active material is separated from the substrate by the electrolyte, the first surface treatment layer, and the anode current collector, and
the first surface treatment layer is in contact with each of the electrolyte, the anode active material and the anode current collector.

2. The thin film battery according to claim 1, wherein the anode active material comprises lithium (Li).

3. The thin film battery according to claim 1, wherein the first surface treatment layer comprises a lower layer comprising an organic material and an upper layer on the lower layer and comprising an inorganic material.

4. The thin film battery according to claim 3, wherein the inorganic material comprises at least one selected from among silicon nitride, aluminum nitride, zirconium nitride, titanium nitride, hafnium nitride, tantalum nitride, silicon oxide, aluminum oxide, zirconium oxide, magnesium oxide, titanium oxide, cerium oxide, indium oxide, tin oxide, SiON, and TiAlO.

5. The thin film battery according to claim 1, further comprising:
a second surface treatment layer on a rear side of the substrate.

6. The thin film battery according to claim 5, wherein the second surface treatment layer comprises at least one of CaO, MgO and $CaCl_2$.

7. The thin film battery according to claim 1, wherein the first surface treatment layer comprises an organic material non-reactive to the anode active material.

8. The thin film battery according to claim 7, wherein the organic material comprises at least one of a diazo resin, an azide resin, an acrylic resin, a polyamide resin, a polyester resin, an epoxy resin, a polyether resin, an urethane resin, a polystyrene resin, an urea resin, an isocyanate resin, or a xylene resin.

9. The thin film battery according to claim 1, wherein the anode current collector is separated from the electrolyte by the anode active material and the first surface treatment layer.

10. The thin film battery according to claim 1, wherein a first side surface of the first surface treatment layer is adjacent to the electrolyte, a second side surface of the first surface treatment layer opposite the first side surface is adjacent to the anode collector, and a surface of the first surface treatment layer on side of the first surface treatment layer opposite the substrate is in contact with the anode active material.

11. The thin film battery according to claim 1, wherein the anode active layer is free from direct physical contact with the substrate.

12. The thin film battery according to claim 1, wherein the electrolyte is in direct physical contact with the substrate and the electrolyte is free from direct physical contact with the anode current collector.

13. A thin film battery comprising:
a substrate;
a cathode current collector on one side of the substrate;
a cathode active material on the cathode current collector;
an anode current collector on the other side of the substrate and separated from the cathode current collector;
an electrolyte covering the cathode active material without overlapping with the anode current collector;
a first surface treatment layer on an exposed portion of the substrate between the electrolyte and the anode current collector; and
an anode active material on the anode current collector, the electrolyte, and the first surface treatment layer,
wherein the first surface treatment layer comprises an organic material non-reactive to the anode active material.

14. The thin film battery according to claim 13, wherein the first surface treatment layer comprises at least one selected from among a diazo resin, an azide resin, an acrylic resin, a polyamide resin, a polyester resin, an epoxy resin, a polyether resin, an urethane resin, a polystyrene resin, an urea resin, an isocyanate resin, and a xylene resin.

15. A method of manufacturing a thin film battery, comprising:
forming a cathode current collector on one side of a substrate;
forming a cathode active material on the cathode current collector;
forming an anode current collector on the other side of the substrate to be separated from the cathode current collector;
forming an electrolyte to cover the cathode active material without overlapping with the anode current collector;
forming a first surface treatment layer on a portion of the substrate exposed by non-overlap between the electrolyte and the anode current collector; and
forming an anode active material on the anode current collector, the first surface treatment layer, and the electrolyte,
wherein the first surface treatment layer comprises an organic material non-reactive to the anode active material.

16. The method according to claim 15, wherein the anode active material comprises lithium (Li).

17. The method according to claim 15, wherein the organic material comprises at least one selected from among a diazo resin, an azide resin, an acrylic resin, a polyamide resin, a polyester resin, an epoxy resin, a polyether resin, an urethane resin, a polystyrene resin, an urea resin, an isocyanate resin, and a xylene resin.

18. The method according to claim 17, wherein forming the first surface treatment layer comprises forming a lower layer comprising the organic material and forming an upper layer comprising an inorganic material non-reactive to the anode active material on the lower layer.

19. The method according to claim 17, wherein the inorganic material comprises at least one selected from among silicon nitride, aluminum nitride, zirconium nitride, titanium nitride, hafnium nitride, tantalum nitride, silicon oxide, aluminum oxide, zirconium oxide, magnesium oxide, titanium oxide, cerium oxide, indium oxide, tin oxide, SiON, and TiAlO.

20. The method according to claim 15, further comprising:
forming a second surface treatment layer on a rear side of the substrate to prevent moisture-penetration through the rear side thereof.

* * * * *